UNITED STATES PATENT OFFICE.

PIETRO LEONARDI, PIETRO ZEN, AND GIUSEPPE SARDI, OF VENICE, ITALY.

INSECTICIDE.

SPECIFICATION forming part of Letters Patent No. 458,908, dated September 1, 1891.

Application filed December 24, 1890. Serial No. 375,738. (No specimens.) Patented in Italy August 20, 1890, No. 28,047.

*To all whom it may concern:*

Be it known that we, PIETRO LEONARDI, PIETRO ZEN, and GIUSEPPE SARDI, subjects of the King of Italy, and residents of Venice, Italy, have invented a new and useful Insecticide, (for which we have received Italian Patent No. 28,047, dated August 20, 1890,) of which the following is a specification.

Our invention relates to insecticides; and its object is to provide an article of this character which, while destructive to insects, is harmless to human beings or to textile fabrics.

The invention consists in the composition of matter hereinafter described and claimed.

In carrying out our invention we place in a suitable receptacle, preferably provided with a tap or discharge-cock, thirty parts of dried and powdered chrysanthemum flowers or *Turreaum*, and then mix with the same ten parts of liquid ammonia, one hundred parts of alcohol at ninety-five per cent., and fifteen parts of ether. Heat is then applied to the receptacle in any convenient manner and the mixture raised to the boiling-point. As a result, the ammonia frees from the powdered flowers the active principle therein, which is taken up by the alcoholic-etheric liquid, and the latter is subsequently withdrawn from the receptacle for use or storage. The liquid insecticide thus obtained, when sprinkled in such places as are infested by insects, such as flies, mosquitoes, fleas, bugs, lice, cockroaches, ants, &c., will effectually disperse and destroy them. Furthermore, the liquid, being highly hygienic, improves the air of the room in which it is used and does not affect persons having a weak constitution or such as suffer from lung disease. It is also harmless to textile fabrics with which it may be brought in contact. The thicker residue in the receptacle after the liquid has been withdrawn, and which contains some active principle of the powdered flowers, may be mixed with water and sprinkled upon plants, trees, and shrubs to destroy insects thereon.

Having thus described our invention, what we claim as new, and desire to secure by Letters Patent, is—

The herein-described composition of matter to be used as an insecticide, consisting of chrysanthemum flowers, liquid ammonia, alcohol, and ether, substantially in the proportions specified.

In testimony that we claim the foregoing as our invention we have signed our names, in the presence of two witnesses, this 16th day of October, 1890.

PIETRO LEONARDI.
    PIETRO ZEN.
    GIUSEPPE SARDI.

Witnesses:
 G. B. ZANARDO,
 G. B. BORTOLMIO.